United States Patent [19]
Cicero

[11] 3,837,678
[45] Sept. 24, 1974

[54] ANTI JACK KNIFE APPARATUS
[75] Inventor: Rocco Cicero, Brooklyn, N.Y.
[73] Assignee: The Raymond Lee Organization, Inc., New York, N.Y. ; a part interest
[22] Filed: May 3, 1973
[21] Appl. No.: 357,015

[52] U.S. Cl. ............................................ 280/432
[51] Int. Cl. ........................................... B62d 53/08
[58] Field of Search .................................... 280/432

[56] References Cited
UNITED STATES PATENTS
| | | | |
|---|---|---|---|
| 2,468,705 | 4/1949 | Price | 280/432 |
| 2,545,339 | 3/1951 | Brewster | 280/432 |
| 2,692,147 | 10/1954 | Whitney | 280/432 |
| 2,714,017 | 7/1955 | Mendez | 280/432 |
| 2,773,701 | 12/1956 | Safko | 280/432 |
| 3,722,918 | 3/1973 | Conner | 280/432 |

FOREIGN PATENTS OR APPLICATIONS
| | | | |
|---|---|---|---|
| 1,219,280 | 10/1971 | Great Britain | 280/432 |

Primary Examiner—Leo Friaglia

[57] ABSTRACT

Anti-Jack Knife Apparatus comprising a horizontal member pivotally secured to the rear of a tractor and pivotable in the longitudinal direction in a vertical plane. The member is horseshoe shaped and has a longitudinal recess extending from one end disposed at a point intermediate the edges to the other end at an edge of the member. A vertical rod rigidly secured to the front of a trailer extends downward into the recess at the one end. The rod is rotatable in the recess. Means is provided with an element having extended and withdrawn positions. In the extended position, the element extends into the recess and locks the trailer and tractor into longitudinally aligned positions. The element in withdrawn position is withdrawn from the recess to unlock the trailer and tractor. Jack knifing cannot occur when the trailer and tractor are locked together.

4 Claims, 2 Drawing Figures

ANTI JACK KNIVE APPARATUS

SUMMARY OF THE INVENTION

My invention is directed toward apparatus which can prevent jack knifing action of a trailer tractor combination. To this end, a trailer is connected to a tractor by means of a vertical rod extending into the closed end of a recess in a "fifth wheel" horseshoe shaped member.

Means is provided with an elongated element having an extended and a withdrawn position. When the element is in extended position, the element extends into the recess and locks the tractor and trailer into aligned longitudinal position whereby jack knife action cannot occur. When the element is withdrawn, it is removed from the recess and conventional action including jack knifing can occur.

DETAILED DESCRIPTION OF PREFERRED EMBODIMENTS

Figure 1:
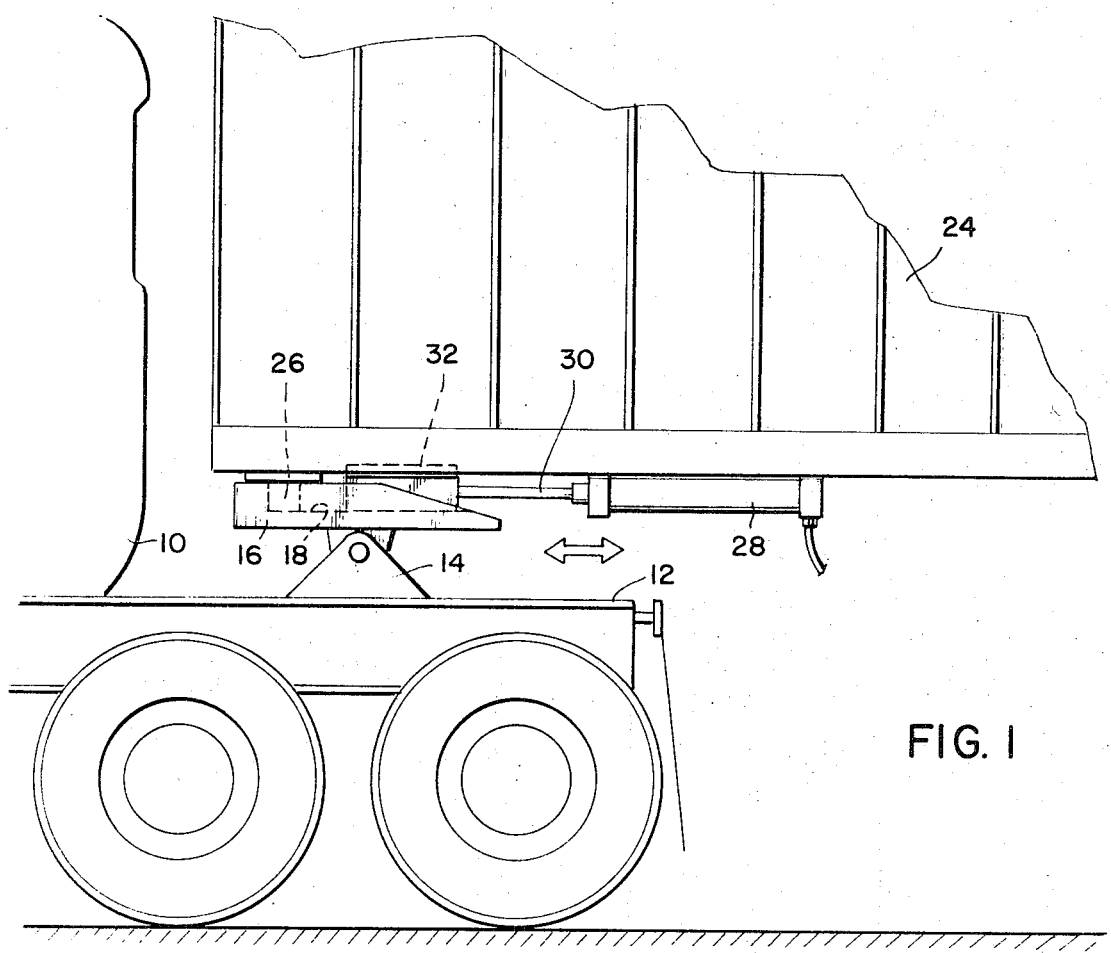
FIG. 1 is a detail side view of my invention in use.
Figure 2:
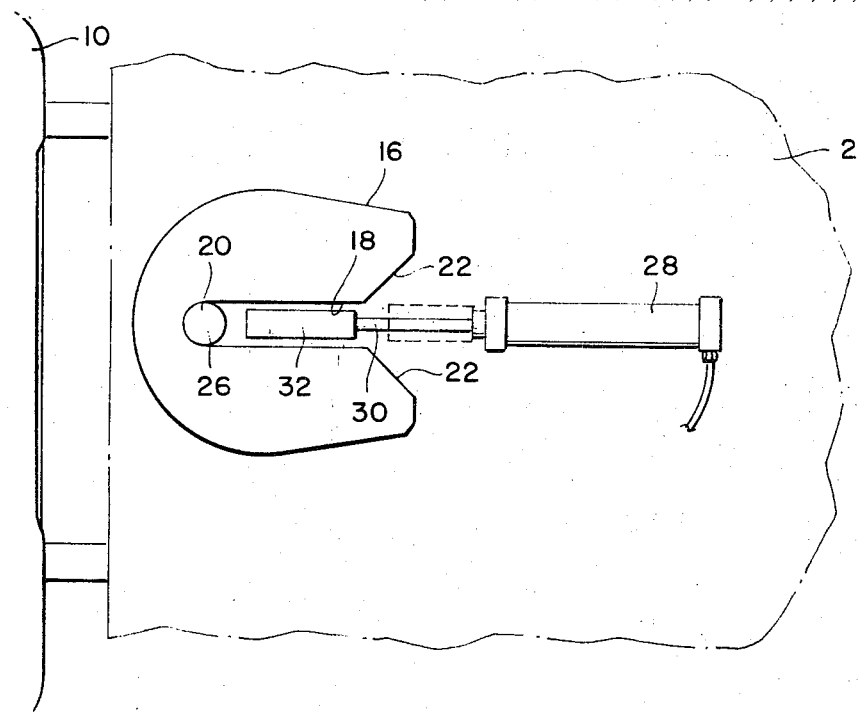
FIG. 2 is a detail top view of my invention.

Referring now to FIGS. 1 and 2, a tractor 10 has disposed on its rear deck 12 a pivot 14 to which is secured a fifth wheel flat horseshoe shaped member 16 having a longitudinal recess 18 extending from an intermediate point 20 in the member, which represents one end of the slot, outward clearing the edge via an enlarged V-shaped opening 22. Member 16 is normally horizontal and is fixed in position so as not to shift from side to side. The member can pivot in a vertical plane along the longitudinal direction.

A trailer 24 has a vertical rod 26 extending downward from the bottom of the front end into the slot at point 20.

An hydraulically operated cylinder 28 secured to the underside of the trailer and extending in the longitudinal direction has a piston 30 with an enlarged head 32.

The piston when actuated by the hydraulic control of the cylinder extends forward with head 32 extending in the recess adjacent rod 26 to provide the locking anti-jack knife action. The piston otherwise is withdrawn with head 32 out of the recess whereby the trailer and tractor are not locked along the same longitudinal line and jack knifing can occur. The piston head must be clear of the fifth wheel when withdrawn.

The cylinder can be operated by an air instead of hydraulically. The cylinder can be spring loaded to hold the head in either position as desired.

There is a clearance of 1 inch on each side of the fifth wheel so that the tractor-trailer can change lanes with anti-jacknife apparatus on.

While I have described my invention with particular reference to the drawings, such is not to be considered as limiting its actual scope.

Having thus described this invention, what is asserted and claimed as new is:

1. Anti-jack knife apparatus adapted for use with a tractor and trailer, said apparatus comprising:

a horizontal member having a longitudinally extending recess terminating at one end at an edge of the member and at the other end in the member at a point intermediate the edges, said member being secured pivotally either to the rear of the tractor or the front of the trailer and being pivotal in the longitudinal direction in a vertical plane;

a vertical rod having one end extending into said other end of said longitudinal recess and rotatable about its axis in the slot, the rod being secured to the one of the trailer or tractor which does not carry the member to provide a vertical articulative connection between said tractor and trailer;

and means mounted on the one of the trailer or tractor which does not carry the member and having an element which in one position can be extended into the recess to lock the tractor and trailer into longitudinally aligned positions whereby jack knifing cannot occur, said element in another position being withdrawn to unlock trailer and trailer whereby jack knifing can occur.

2. Apparatus of claim 1 wherein said means is a cylinder and the element is a piston slidable into and out of the cylinder.

3. Apparatus of claim 2 wherein said means in hydraulically operated or air operated.

4. Apparatus of claim 3 wherein said member is a fifth wheel and is secured to the trailer.

* * * * *